US009555878B2

(12) United States Patent
Arnold et al.

(10) Patent No.: US 9,555,878 B2
(45) Date of Patent: Jan. 31, 2017

(54) ROTOR BLADE CONTROL DEVICE

(75) Inventors: Uwe Arnold, Kassel (DE); Carsten Wintjen, Grebenstein (DE); Andre Hausberg, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 350 days.

(21) Appl. No.: 14/345,615

(22) PCT Filed: Aug. 2, 2012

(86) PCT No.: PCT/EP2012/065136
§ 371 (c)(1),
(2), (4) Date: Apr. 9, 2014

(87) PCT Pub. No.: WO2013/041282
PCT Pub. Date: Mar. 28, 2013

(65) Prior Publication Data
US 2014/0377068 A1    Dec. 25, 2014

(30) Foreign Application Priority Data
Sep. 19, 2011  (DE) .................. 10 2011 082 910

(51) Int. Cl.
*B64C 11/06* (2006.01)
*B64C 27/04* (2006.01)
*B64C 27/605* (2006.01)

(52) U.S. Cl.
CPC ............ *B64C 27/04* (2013.01); *B64C 27/605* (2013.01)

(58) Field of Classification Search
CPC ......... B64C 27/54; B64C 27/04; B64C 27/605
(Continued)

(56) References Cited

U.S. PATENT DOCUMENTS 2,549,313 A * 4/1951 Johnson ............... B64C 27/605
                                                416/168 R
4,243,358 A * 1/1981 Carlock ............... B64C 27/605
                                                416/114
(Continued)

FOREIGN PATENT DOCUMENTS

DE         100 01 378 A1    8/2000
DE    20 2007 000987 U1     4/2007
(Continued)

OTHER PUBLICATIONS

German Office Action for DE 102011082910.5, dated Dec. 12, 2011 (German Language) (5 pages).
(Continued)

*Primary Examiner* — Jessica Cahill
(74) *Attorney, Agent, or Firm* — Brinks Gilson & Lione

(57) ABSTRACT

The present disclosure provides a rotor blade control device for a helicopter. The rotor blade control device may include a swash plate disk with a non-rotating component coupled to the helicopter. At least three actuators may be arranged around a rotor shaft axis of the helicopter, and a coupling element may be located between each actuator and the non-rotating component. The coupling element can be adjusted to change the position of a crosspoint at the non-rotating component of the swash plate disk alongside the rotor shaft axis in order to adjust the rotor blades. The actuators may be arranged onto the non-rotating component and may be able to pivot around a respective swivel axis. A radial distance of the first crosspoint to the rotor shaft axis may change with the swivel movement of an actuator around the swivel axis.

8 Claims, 2 Drawing Sheets

Figure 1:
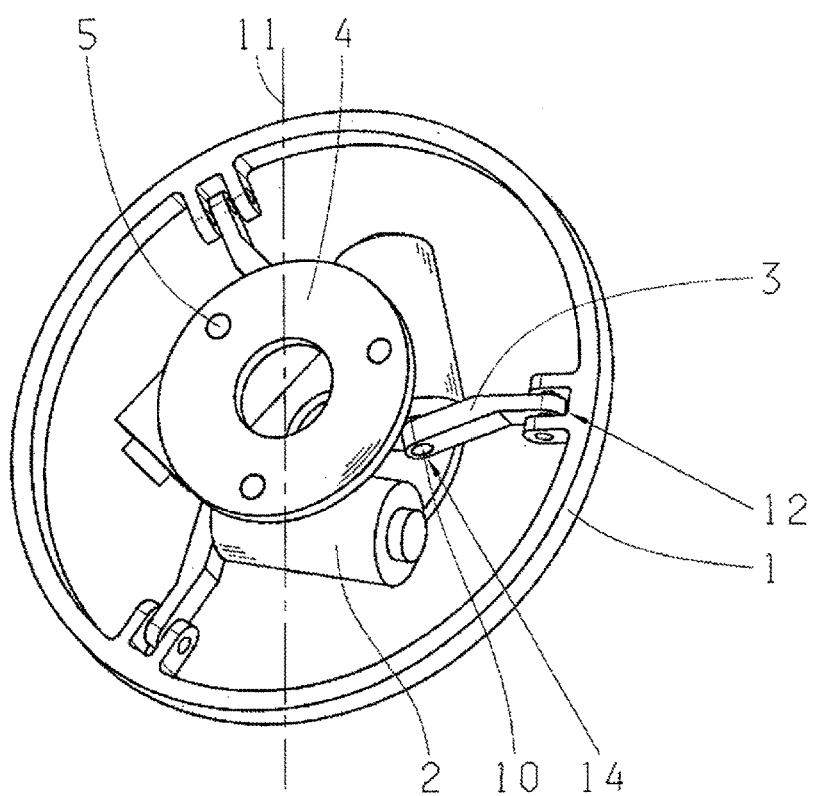

(58) Field of Classification Search
USPC .......................................................... 416/114
See application file for complete search history.

(56) References Cited

U.S. PATENT DOCUMENTS

| | | | | |
|---|---|---|---|---|
| 4,274,808 | A | * | 6/1981 | Garner .................... B64C 27/72 416/1 |
| 6,533,549 | B1 | * | 3/2003 | Schreiber ................ B64C 27/58 416/114 |
| 2007/0128037 | A1 | * | 6/2007 | Schmaling ............ B64C 27/605 416/134 A |
| 2010/0084517 | A1 | * | 4/2010 | Benson ................. B64C 27/605 244/228 |
| 2012/0282103 | A1 | * | 11/2012 | Muren .................... B64C 27/68 416/205 |

FOREIGN PATENT DOCUMENTS

| | | |
|---|---|---|
| EP | 2 155 553 B1 | 5/2011 |
| FR | 2 917 709 A1 | 12/2008 |
| FR | 2 945 269 A1 | 11/2010 |
| WO | WO 2009/010644 A2 | 1/2009 |
| WO | WO 2011/078684 A2 | 5/2011 |

OTHER PUBLICATIONS

International Search Report and Written Opinion from corresponding International Patent Application PCT/EP2012/065136, dated Jan. 8, 2014 (German Language).

* cited by examiner

ROTOR BLADE CONTROL DEVICE

This application is the U.S. National Stage under 35 U.S.C. §371 of International Patent Application PCT/EP2012/065136, filed Aug. 2, 2012, which claims the priority of DE 102011082910.5, filed Sep. 19, 2011. These applications are incorporated by reference herein in their entirety.

The invention relates to a rotor blade control device for a helicopter.

In a helicopter, a rotor shaft is propelling a rotor head. The rotor blades are arranged in such a way on the rotor head, that they are rotatable regarding their longitudinal axis as well as pivoting regarding their angle between their longitudinal axis and the rotation axis of the rotor shaft. In order to control the flight movement of a helicopter, it is necessary to adjust the torsion angle of the rotor blades around their longitudinal axis. This is accomplished by means of a swash plate, which is penetrated by the rotor shaft and which can be moved and tilted towards the rotor shaft axis.

The disk-shaped swash plate, which will be described as swash plate disk in the following, consists of a disk-shaped part which is stationary connected to the helicopter, described in the following as non-rotating part of the swash plate disk, and another ring-shaped disk which is mounted to the first disk so that it can rotate around their common center axis and which is rotationally fixed to the rotor shaft, described in the following as rotating part of the swash plate disk. The non-rotating part of the swash plate disk is for example mounted by a spherical bearing, which allows a tilting, and which can be moved parallel or coaxial towards the rotor shaft axis.

The rotating part of the swash plate disk is connected rotationally to the rotor shaft by means of connecting rods, and is thus turning with the speed of the rotor shaft. In order to adjust the rotor blades, the non-rotating part of the swash plate disk can be operated by means of actuators and thus move it alongside the rotor shaft axis or tilt it towards the rotor shaft axis, whereby these movements may overlap, depending on the flight maneuvers that are to be performed. By means of the rotatable mounting between the non-rotating part of the swash plate disk and the rotating part of the swash plate disk, these movements are transmitted to the rotating part of the swash plate disk. By means of adjustment elements, such as control rods, which are located between the rotating part of the swash plate disk and the rotor blades, these movements are transformed into the desired movements of the rotor blades.

The actuators are generally operated hydraulically, but due to disadvantages of hydraulic actuators, like for example additional weight, possibility of leakages, high maintenance costs as well as fire hazard and toxicity, electromechanical actuators are used more and more.

From EP 2 155 553 B1 a helicopter rotor blade control device is known, which consists of a swash plate disk that is made up of a non-rotating part of the swash plate disk (this means a disk-shaped plate which is not rotating in relation to the helicopter), and a rotating part of the swash plate disk. The rotating part of the swash plate disk is arranged coaxially towards the non-rotating part of the swash plate disk, which is mounted stationary to the housing or the helicopter, and is rotating around a common center axis of both parts of the swash plate disk. Further, the rotating part of the swash plate disk is mounted axially and radially towards the non-rotating part of the swash plate disk.

The movement or the tilting of the non-rotating part of the swash plate disk is hereby accomplished by means of three electromechanical actuators, which are in operative connection to the non-rotating part of the swash plate disk by means of three rod-shaped extensions, that are equally distributed along the side of the circumference of the disk-shaped non-rotating part of the swash plate disk. The extensions are arranged on the non-rotating part of the swash plate disk, and extend from there toward the outside in radial direction. Each actuator consists of a lever that can be tilted around the rotational axis of a control shaft of the actuator, which is in sliding connection to the side extension of the non-rotating part of the swash plate disk by means of a sliding element. Depending on the desired tilting or movement of the non-rotating part of the swash plate disk, the levers of the respective actuators can be pivoted independently from each other at a certain angle. This means that for each adjustment angle of the control shafts or of the levers, the corresponding connection position on the non-rotating part of the swash plate disk takes an exact defined position in space. Thus, a spherical bearing for guiding the non-rotating part of the swash plate disk is not needed anymore. A separate axial guiding of the swash plate disc can be omitted. Since the non-rotating part of the swash plate disk is connected to the helicopter by means of the levers, the sliding element and the extensions, no further elements are necessary to prevent the non-rotating part of the swash plate disk from rotating.

The rod-like side extensions, which stretch radially away from the non-rotating part of the swash plate disk, and thus the actuators which are positioned on the radial outside, have the disadvantage that they demand a large construction space. The means of connecting the actuator and the non-rotating part of the swash plate disk is constructed in a complex way with two parts, namely the lever and the sliding element. Further, the sliding- and pivoting connection between the actuators and the extensions demand extensive maintenance, like for example the lubrication of the sliding parts as well as the inspection of the lubrication condition of the sliding surfaces. In addition to this, it is possible that the backlash of the sliding- and pivoting joints add up, which would impair the precision of the adjustment.

The object of the invention is to create a maintenance friendly rotor blade control device in a simple way, with little construction space and a reduced amount of parts.

The object is achieved by means of the characteristics of patent claim 1.

Here, a rotor blade control device for a helicopter features a swash plate disk which consists of a disk-shaped non-rotating part, a disk-shaped rotating part, at least three actuators which are arranged around a rotor shaft axis of the helicopter and a coupling element between each actuator and the non-rotating part of the swash plate disk. The actuators are linked to a stationary component which is solidly fixed onto the helicopter, whereby the actuator consists of a control shaft that can be twisted around a control axis. The stationary component is to be understood as a part, which is solidly connected to the helicopter or to the structure of the helicopter. The rotating part of the swash plate disk is arranged coaxially towards the non-rotating part of the swash plate disk, and is mounted rotatably onto the non-rotating part of the swash plate disk, which is stationary connected to the helicopter due to its coupling with the actuator and does not turn around the rotor shaft axis. The coupling element is connected to the control shaft at a first crosspoint on the control axis in a torque-proof way, and cannot be moved axially on the control axis, so that the coupling element and the control axis with the actuator compose a pivot joint. The coupling element is flexibly linked to the non-rotating part of the swash plate disk at a second crosspoint, so that the second crosspoint can be moved at least alongside the rotor shaft axis by means of twisting the control shaft. The control shafts of the respective actuators can be twisted independent from each other according to the desired tilt or movement of the non-rotating part of the swash plate disk at a certain adjustment angle, so that the respective second crosspoint takes a defined point in space for each adjustment angle of the control shafts. Here, the coupling element is solidly fixed and the actuators are arranged in a way that they can be pivoted around a respective swivel axis on the stationary component. The coupling element can be pivoted in all directions around the second crosspoint. The first crosspoint has a radial distance to the swivel axis. The control axis and the swivel axis are arranged in such a way toward each other, that the radial distance of the first crosspoint to the rotor shaft axis changes with the movement of the actuator.

Advantageously, the first and the second crosspoint are linked to each other by only one part, that is the coupling element, which itself is rigid. This is advantageous concerning the amount of parts of the coupling element. In addition to that, since there is only one joint in the second crosspoint, which further allows for only pivoting- and no sliding movements, the maintenance efforts are minimal.

Advantageous embodiments of the invention are to be derived from the dependent claims.

In one advantageous embodiment, the swivel axis is arranged parallel to the rotor shaft axis, and the control axis is located in a vertical plane, perpendicular to the orientation of the rotor shaft axis, and has a radial distance to it.

In this connection it is possible, that the control axis and the swivel axis are arranged perpendicular towards each other, and that they have a common point of intersection while being positioned in the same plane.

Advantageously, the embodiment is constructed in such a way, that the actuators and the coupling element are arranged radially inside of the non-rotating part of the swash plate disk. By means of this, the needed radial construction space for the rotor blade control device with regard to the rotor shaft axis is minimal.

In a preferred embodiment, the coupling element is formed in one piece as a lever. Hereby, the coupling element features a particularly high stiffness, so that there is a minimal bending while transmitting the adjustment force from the actuator to the non-rotating part of the swash plate disk. Further, by means of the construction in one piece, there is a reduction in the diversity of parts, and assembly operations can be prevented or simplified.

It is possible that a ball joint is arranged inside the second crosspoint, between the lever and the non-rotating part of the swash plate disk.

In one embodiment of the invention, the actuators are designed as electric motors.

Alternatively, the actuators could also be designed as hydraulic swivel motors for this purpose.

The actuators preferably have an inner redundancy.

Preferably, it is possible, that a helicopter is featuring a rotor blade control device according to the invention.

One embodiment of the invention is displayed in the drawing, and will be further described in more detail.

Figure 2:
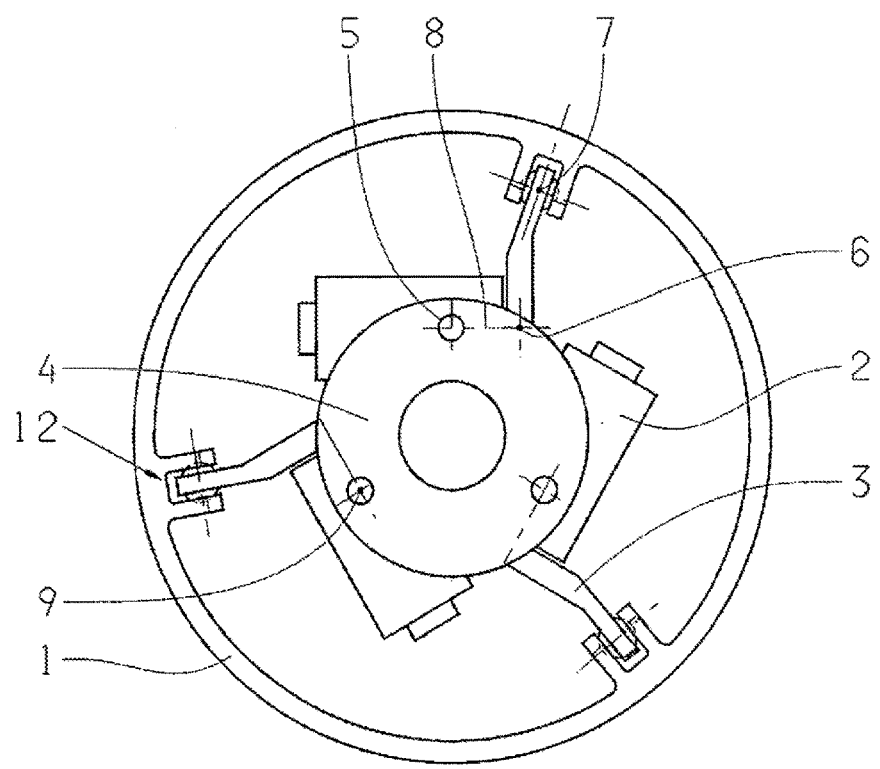

It is displayed:

FIG. 1 a perspective view of the rotor blade control device according to the invention, and FIG. 2 a top view of the rotor blade control device according to the invention.

FIG. 1 shows a simplified perspective depiction of a rotor blade control device according to the invention in installation position. The rotor blade control device consists of a swash plate disk and actuating elements for its adjustment. From a swash plate disk consisting of a rotating part and a non-rotating part, only the non-rotating part of the swash plate disk 1 is depicted, onto which the rotating part of the swash plate disk is mounted rotatably around the common center axis. Component 4 does not belong to the rotor blade control device, which is to be understood as a part of the overall helicopter system, which is stationary in relation to the structure of the helicopter or solidly connected to it. In a central passage of the stationary component 4, a rotor shaft is arranged, which is propelled by a drive motor (both are not depicted) and which turns around rotor shaft axis 11. In installation position, or in a standing helicopter, rotor shaft axis 11 is basically vertical. Three actuators 2 are pivotally connected to the stationary component 4, around a control axis 5 or a swivel axis 9 respectively (see FIG. 2). The three actuators 2 and the elements which are connected to them are the same. In the current example, actuators 2 are made in form of electromechanical actuators, which consist of control shafts 10 that can be turned electromechanically around a control axis 8 (see FIG. 2). The electromechanical actuators can for example be made in form of electric step motors, with which it is possible to turn control shaft 10 by a certain adjustment angle. Alternatively to this, hydraulic actuators, such as for example hydraulic swivel motors, could also be used. A coupling element, which is designed as lever 3 is connected to control shaft 10 in a torque-proof way, at a first crosspoint 6 which is located on control axis 8, and is axially fixed onto this control shaft 10, so that the coupling element and the control shaft with the actuator compose a pivot joint 14. In this way, lever 3, which is made in one piece in this example and which itself is rigid, can be turned around a certain adjustment angle by means of actuator 2, along with control shaft 10. In a second crosspoint 7, lever 3 is connected to the non-rotating part of swash plate disk 1 with a fully flexible joint, and can be pivoted in all directions around the second crosspoint 7. A ball joint 12 is arranged inside the second crosspoint 7, between lever 3 and the non-rotating part of the swash plate disk 1. The second crosspoint 7 is thus the hinge point of ball joint 12.

This means that the adjustment angle of control shaft 10 or of lever 3 determines the axial position of the second crosspoint 7, and thus the position of the non-rotating part of the swash plate disk 1 with regard to rotor shaft axis 11. The twisting of the individual control shafts 10 of the respective actuators 2 is done independent of each other.

FIG. 2 shows the rotor blade control device according to the invention in simplified depiction in top view, which means in installation position from above. In this connection, the position of the swivel axis 9 of actuator 2 and of control axis 8 of control shaft 10 or of lever 3 is depicted. As it can be seen in FIG. 1, swivel axis 9 is arranged parallel to rotor shaft axis 11. Control axis 8 extends into a vertical projection plane, perpendicular to rotor shaft axis 11, which means that if rotor shaft axis 11 is arranged vertically, then the position of control axis 8 is horizontal. Originating from rotor shaft axis 11, control axis 8 has a radial distance to it. Further, the first crosspoint 6, at which lever 3 is connected to control shaft 10 in a torque-proof way, has a radial distance to swivel axis 9. Control axis 8 and swivel axis 9 are located in the same vertical plane and intersect each other.

In a rotor blade control device of a helicopter, the rotating part of the swash plate disk (which is not displayed) is mounted axially and in radial direction onto the non-rotating part of swash plate disk 1, which turns with the speed of the rotor shaft around the center axis of the non-rotating part of swash plate disk 1. By means of a mere movement of the non-rotating part of swash plate disk 1 along rotor shaft axis 11 (which means that the center axis of the non-rotating part of swash plate disk 1 is corresponding to rotor shaft axis 11), the rotor blades are equally twisted around their longitudinal axis at the same angle by means of the adjustment elements that are coupled via the rotating part of the swash plate disk. The more the non-rotating part of swash plate disk 1 is axially moved, originating from a position of minimal rotor blade twist, the greater the rotor blade twist will be. This also means, that the rotor blade twist of a rotor blade will stay consistent during a turning of the rotor. In order to set such a position, all actuators 2 have to turn the levers 3 at the same adjustment angle. If the adjustment angle of the rotor blades is to change during the turn of a rotor, the non-rotating part of swash plate disk 1, and thus the swash plate disk has to be tilted in regards to rotor shaft axis 11, so that the center axis of the non-rotating part of swash plate disk 1 and rotor shaft axis 11 are inclined toward each other. For this, the adjustment angles of the actuators 2 have to be different. In the same way, the inclination of the rotor blades towards the rotor shaft axis can be changed by moving the non-rotating part of swash plate disk 1 or of the swash plate disk alongside the rotor shaft axis.

The function of the displayed rotor blade control device shall be explained by means of the following example. The original state of the rotor blade control device is as it is depicted in FIGS. 1 and 2, which means that all actuators 2 are setting the same control angle in such a way, that all levers 3 or the crosspoints 6 and 7 are positioned in one plane, perpendicular to rotor shaft axis 11. The actuators 2 are pivoted into a position, in which the first crosspoints 6 of the levers 3 have the least radial distance to rotor shaft axis 11 within the entire adjustment range of the actuators 2. If the non-rotating part of swash plate disk 1 is now to be moved entirely alongside rotor shaft axis 11, then all actuators 2 twist the levers 3 at the same adjustment angle, for example upwards. During this adjustment, the second crosspoint 7, and thus the ball joint moves on a circular radius around control axis 8, by means of which it would move radially closer to rotor shaft axis 11 if the actuators 2 would be solidly fixed to the stationary component 4, which would not be possible, due to the coupling with the non-rotating part of swash plate disk 1.

Lever 3 can be twisted and the second crosspoint 7 can be moved parallel to rotor shaft axis 11, because the distance between the first crosspoint 6 and rotor shaft axis 11 increases due to the pivoting of actuator 2 around swivel axis 9, and thus the distance between the second crosspoint 7 and rotor shaft axis 11 stays constant. Would the second crosspoint 7 be arranged as a simple joint, which would only work in one plane, then lever 3 would distort or deform to the side. For this reason, the second crosspoint 7 is designed as a ball joint, whose degrees of freedom compensate the displacement of the first crosspoint 6.

This mechanism works in the same way at a tilting of the non-rotating part of the swash plate disk, and thus of the swash plate disk, whereby in such a case different adjustment angles would have to be set by the actuators. Depending on the flight maneuver that is to be performed, a tilting can also be overlapping with a general movement of the non-rotating part of the swash plate disk and thus of the swash plate disk alongside rotor shaft axis 11.

REFERENCE SIGNS

1 non-rotating part of the swash plate disk
2 actuator
3 coupling element, lever
4 stationary component
5 swivel shaft
6 crosspoint
7 crosspoint
8 control axis
9 swivel axis
10 control shaft
11 rotor shaft axis
12 ball joint
14 pivot joint

The invention claimed is:
1. A rotor blade control device for a helicopter comprising a swash plate disk, the swash plate disk comprising:
   a non-rotating part of the swash plate disk;
   at least three actuators which are arranged around a rotor shaft axis of the helicopter, each of the at least three actuators connected to a stationary component in relation to the helicopter; and
   a coupling element between each of the at least three actuators and the non-rotating part of the swash plate disk,
   wherein each of the at least three actuators comprises a control shaft, which can be twisted around a control axis, and the coupling element is connected to the control shaft in a torque-proof way at a first crosspoint being located on the control axis, and to the non-rotating part of the swash plate disk at a second crosspoint in a flexible way, so that by means of a twisting of the control shaft the second crosspoint is moved at least alongside the non-rotating part of the swash plate disk via the coupling element,
   wherein the control shafts of each of the at least three actuators can be twisted at a certain adjustment angle respectively, independent of each other, according to a desired tilt or movement of the non-rotating part of swash plate disk, so that the second crosspoint at the non-rotating part of the swash plate disk takes a defined point in space,
   wherein the coupling element, which can be swiveled in all directions around the second crosspoint, is made up in a rigid way, and each of the at least three actuators is arranged onto the stationary component, being able to pivot around a respective swivel axis, and that the first crosspoint having a radial distance to the swivel axis, and
   wherein the control axis and the swivel axis are arranged in such a way toward each other, and a radial distance of the first crosspoint to the rotor shaft axis changes with the swivel movement of each of the at least three actuators around the swivel axis.
2. The rotor blade control device according to claim 1, wherein each of the at least three actuators and the coupling element are arranged radially inside of the non-rotating part of the swash plate disk.
3. The rotor blade control device according to claim 1, wherein each of the at least three actuators is an electric motor.
4. The rotor blade control device according to claim 1, wherein each of the at least three actuators is a hydraulic swivel motor.
5. The rotor blade control device according to claim 1, wherein the swivel axis is arranged parallel to the rotor shaft axis, and the control axis is located in a vertical plane, perpendicular to the orientation of the rotor shaft axis, the control axis having a radial distance to the rotor shaft axis.

6. The rotor blade control device according to claim 5, wherein the control axis and the swivel axis are arranged perpendicular towards each other, and the control axis and the swivel axis have a common point of intersection while being positioned in the same plane.

7. The rotor blade control device according to claim 1, wherein the coupling element is formed in one piece as a lever.

8. The rotor blade control device according to claim 7, wherein a ball joint is arranged inside the second crosspoint, between the lever and the non-rotating part of the swash plate disk.

* * * * *